United States Patent [19]

Kutta

[11] 4,329,179

[45] May 11, 1982

[54] METHOD FOR ENCAPSULATING ARSENIC-CONTAMINATED WASTES

[75] Inventor: Helmuth W. Kutta, Richardson, Tex.

[73] Assignee: Atlantic Richfield Company, Los Angeles, Calif.

[21] Appl. No.: 204,140

[22] Filed: Nov. 5, 1980

[51] Int. Cl.$^3$ ............................................. C04B 7/02
[52] U.S. Cl. ...................... 106/97; 106/98; 106/104
[58] Field of Search ............ 106/85, 89, 97, 98, 106/100, 117, 120; 405/128, 129, 266, 267

[56] References Cited

U.S. PATENT DOCUMENTS

| | | | |
|---|---|---|---|
| 254,530 | 3/1982 | Budlong | 106/97 |
| 954,692 | 4/1910 | Phillips | 106/98 |
| 1,875,897 | 9/1932 | Stalhane et al. | 106/89 |
| 1,988,821 | 1/1935 | Werner et al. | 106/89 |
| 2,028,420 | 1/1936 | Stalhane | 106/104 |
| 3,947,283 | 3/1976 | Uchikawa et al. | 106/89 |
| 3,980,558 | 9/1976 | Thompson | 210/59 |
| 4,051,022 | 9/1977 | Myers et al. | 208/253 |
| 4,124,405 | 11/1978 | Quienot | 106/89 |
| 4,132,558 | 1/1979 | Uchikawa et al. | 106/89 |
| 4,142,912 | 3/1979 | Young | 106/97 |

FOREIGN PATENT DOCUMENTS

| | | | |
|---|---|---|---|
| 50-93264 | 7/1975 | Japan | 106/104 |

OTHER PUBLICATIONS

Taylor, The Chemistry of Concretes, Academic Press, New York, N.Y.; 1964, vol. 1, pp. 9–24, vol. 2, pp. 24–27.

Lea and Desch, The Chemistry of Cement and Concrete, Ed., Arnold (Pubs.) Ltd., London, 1956, pp. 454–459.

*Primary Examiner*—James Poer
*Attorney, Agent, or Firm*—Drude Faulconer

[57] ABSTRACT

A method for encapsulating an arsenic-contaminated waste material, e.g. spent guard bed material, in a concrete formed by mixing the waste material with a tricalcium aluminate-free hydraulic cement, e.g. aluminous cement, and water. The resulting mixture is allowed to harden producing a concrete product which is highly sulfate and acid resistant. By being sulfate resistant, ettringite is not formed even after prolonged periods of exposure thereby insuring the structural integrity of the concrete product which allows it to be used as a permanent landfill material without risk of the arsenic being leached therefrom by contacting water. Aggregate, e.g. sand and/or silica flour may be added, and the mixture can be agitated and/or exposed to steam during curing to substantially increase the density of the final product. In instance of prolonged curing times, an accelerator chemical is added to the mixture to speed curing.

10 Claims, No Drawings

METHOD FOR ENCAPSULATING ARSENIC-CONTAMINATED WASTES

BACKGROUND OF THE INVENTION

The present invention relates to the disposal of arsenic-contaminated waste material and more particularly relates to a method for encapsulating arsenic-contaminated waste material whereby it can be used as a permanent landfill material without the risk of the arsenic compounds later being leached into contacting ground waters.

In many known commercial processes, a waste material is generated which contains substantial amounts of arsenic and/or arsenic compounds. For example, synthetic hydrocarbons obtained from coal, oil shale, tar sands, or the like, normally contain substantial quantities of arsenic and/or arsenic compounds which have to be removed before the hydrocabons can be marketed. One process for treating such hydrocarbons is disclosed and fully described in U.S. Pat. No. 4,051,022, issued Sept. 27, 1977, and involves contacting the hydrocarbons with a guard bed material comprising a metal or combination of metals (e.g. iron, cobalt, nickel) and the oxides or preferably sulfides of said metals. The metal or metal compounds can be used by themselves or can be combined with a conventional support (carrier) e.g. silica, as understood in the art. Upon contact under prescribed conditions, the guard bed material removes and retains the arsenic from the feed hydrocarbons.

When the guard bed material becomes spent, a problem arises in properly disposing of same. The spent material cannot be used directly as a landfill material since it has been found that the arsenic and/or arsenic compounds will readily leach from the spent waste material when contacted by ground waters associated by the landfill site. Since this is ecologically unsound, a disposal process is necessitated which will prevent any substantial leaching of the arsenic from the spent material once it has been used as a landfill material.

Known disposal processes for waste materials of the type described above involve encapsulating the waste material into a concrete substrate and using the finished concrete as a landfill material. For example, both U.S. Pat. Nos. 3,980,558 and 4,142,192 disclose processes wherein arsenic contaminated wastes are mixed with cement and various additives to form a concrete landfill material. However, both references teach that Portland cement is the preferred cement for use in the disclosed processes.

Unfortunately, spent guard bed material of the type discussed above contains sulfur or sulfur compounds, in addition to arsenic. This is due to the original composition of the guard bed and/or from sulfur compounds, e.g. $H_2S$, which may be collected by the guard bed material from the hydrocarbon feed stock during treatment. Portland cement contains substantial amounts of tricalcium aluminate which react with the sulfur compounds, i.e. sulfates, in the spent guard bed materials to form ettringite which, in turn, expands upon as it forms and this causes the concrete to crack and disintegrate thereby effectively destroying the structural integrity of the concrete. Since ettringite may take a relatively long time (e.g. one year) to form, a concrete mass which appears structurally sound at the time of disposal may effectively disintegrate at the end of a prolonged period thereby allowing the arsenic encapsulated in the concrete to become exposed to leaching upon contact with water flowing through the disintegrated concrete. Further, if the ground water itself, (e.g. water containing gypsum) contains sulfur compounds, it may react with the tricalcium aluminate of the Portland cement with the same results.

Accordingly, where the encapsulated waste material contains sulfur and/or sulfur compounds or is likely to be in contact with waters which contain sulfur or sulfur compounds, Portland cement appears to be undesirable as an encapsulating material especially where the encapsulated material is used as a permanent landfill material which is likely to come into contact with ground waters.

SUMMARY OF THE INVENTION

The present invention provides a method for encapsulating an arsenic-contaminated waste material such as spent guard bed material in concrete whereby the final concrete products maintains its structural integrity even after prolonged periods of exposure to sulfates.

More specifically, the arsenic-contaminated material is mixed with a non-Portland, tricalcium aluminate-free hydraulic cement and water to form a mixture having a wet concrete consistency. Aggregate such as sand may be added to add strength to the mixture. The mixture is allowed to harden to form a concrete product which is highly sulfate and acid (to pH4) resistant. As used throughout, tricalcium aluminate-free hydraulic cement refers to those hydraulic cements which do not contain tricalcium aluminate as a constituent or, if any is present, tricalcium aluminate appears as an impurity in the cement in amounts so small they are considered negligible. An example of a tricalcium aluminate-free cement is "aluminous cement."

Where the concrete mixture would require prolonged hardening times, an accelerator chemical, e.g. iron chloride, is added to the concrete mixture to speed its hardening. Further, in some instances, silica flour is used as part of the added aggregate to increase the density of the final concrete product. Likewise, the concrete mixture may be cured or hardened in the presence of steam and/or vibrated during curing to further increase the density of the concrete product. The actual operation and apparent advantages of the present invention will be better understood by referring to the following detailed description.

DESCRIPTION OF THE PREFERRED EMBODIMENT

In accordance with the present invention, an arsenic-contaminated waste material is encapsulated in a concrete mixture formed by mixing the waste material with an aggregate, water and tricalcium aluminate-free hydraulic cement. Where, the curing time is prolonged, an accelerator is added to speed up the hardening time of the concrete mixture. The concrete mixture is allowed to harden into blocks, clinkers, or the like and is then disposed of as permanent landfill material or used for a similar purpose.

In the present invention, the arsenic-contaminated waste material is primarily a solid, granular material having arsenic or arsenic compounds contained therein such as the spent guard bed material used to remove arsenic from synthetic hydrocarbons such as described in U.S. Pat. No. 4,051,022. Also, as used herein, "arsenic" and "arsenic compounds" are used interchangeably and are intended to include arsenic in whatever form, elemental or combined, that may be present in the waste material.

To better understand the improvements provided by and the apparent advantages of the present invention, brief reference is made to the known prior art wherein it is disclosed that arsenic-contaminated wastes may be encapsultated in a concrete mixture prior to disposal. In U.S. Pat. No. 3,980,558, a technique is disclosed for disposing of a liquid, arsenic-contaminated waste by encapsulating it in a concrete mixture formed by mixing the material with a cement and various additives while U.S. Pat. No. 4,142,912 discloses a similar technique for disposing of a solid, arsenic-contaminated waste. It is noted, however, that in both of these references, it is clearly taught that the cement to be used is Portland cement or mixtures containing Portland cement. As will be shown from the following discussion, the present invention requires the use of non-Portland cement, that is, a cement which is free of tricalcium aluminate.

To fully understand the differences between processes for encapsulating arsenic-contaminated wastes which use Portland cement and one which uses a non-Portland cement, the following experimental data and discussion is now set forth. Two experiments were conducted to determine the characteristics of durability and setting a concrete mixture formed by mixing arsenic compounds with Portland cement.

In the first experiment, arsenic trioxide ($As_2O_3$), calcium arsenate ($Ca_3(AsO_4)_2$), and arsenic trisulfide ($As_2S_3$) were each blended with Portland cement and water to an arsenic concentration equivalent to 2.5 percent $As_2S_3$ in each mixture. The water/cement ration was kept at 0.45. Each mix was poured into 2" cubes and allowed to set under water for 24 hours before the forms were taken off. Each cube was rinsed and soaked in 250 ml of water for one month. The leachate from each cube contained less than 1 ppm of arsenic. The cubes were dried and placed in a drawer for storage. One year later the cubes were moved to a new location and the cube containing $As_2S_3$ was cracked and had lost structural integrity, thereby exposing a black interior. It was concluded that the cube had lost its strength. This was most likely due to a reaction of $As_2S_3$ with some components of the cement. No further work was done with the cubes.

In the second experiment, arsenic disulfide, trisulfide and spent guard bed material were incorporated into a Portland cement concrete at concentrations of 2.5 wt percent bsed on the dry concrete mixture. The setting process of these mixtures was greatly retarded.

From the experiments it was concluded that two independent reactions had taken place. Both indicated that Portland cement appeared to be unsuitable for encapsulating of arsenic containing spent guard bed material.

In order to understand the apparent destruction of Portland cement by arsenic compounds, the mechanism of hardening was then reviewed. A typical Portland cement clinker contains four major minerals as shown in Table 1.

TABLE I
FUNCTION OF MINERALS IN PORTLAND CEMENT

| TYPICAL COMPOSITION | |
|---|---|
| 10% $C_3A$ | CAUSES SET BUT NEEDS RETARDATION (BY GYPSUM) |
| 52% $C_3S$ | RESPONSIBLE FOR EARLY STRENGTH (AT 7-8 DAYS) |
| 21% $C_2S$ AND $C_3S$ | RESPONSIBLE FOR FINAL STRENGTH (~ 1 YEAR) |
| 9% $C_4AF$, $Fe_2O_3$, $Al_2O_3$ MgO, alkali | LOWER CLINKER TEMPERATURES, GIVE COLOR |

WHEREIN:
C = CaO
A = $Al_2O_3$
S = $SiO_2$
F = $Fe_2O_3$

Each of the minerals has a specific function and must be present at a certain concentration to assure proper setting and hardening. Setting is the initial stiffening which occurs within a few hours. Hardening is the development of strength, which is a slower process. The reactions that cause setting and hardening are collectively referred to as hydration reactions. The mechanism of hydration is shown in Table 2. Any interference with the hydration leads to a prolonged setting time or even to complete inhibition.

TABLE 2
HYDRATION MECHANISM OF PORTLAND CEMENT

| EQUATION | | |
|---|---|---|
| 1 | $C_3A + 6H_2O \rightarrow$ | $C_3A \cdot 6H_2O$ CRYSTAL |
| 2 | $C_3S + xH_2O \rightarrow$ | $C_2S \cdot xH_2O$ AMORPH + $Ca(OH)_2$ CRYST. |
| 3 | $C_2S + xH_2O \rightarrow$ | $C_2S \cdot xH_2O$ AMORPH + $Ca(OH)_2$ CRYST. |
| 4 | $C_4AF + xH_2O \rightarrow$ | $C_3A \cdot 6H_2O$ CRYST. + $CaO \cdot Fe_2O_3(x-6)H_2O$ |
| ETTRINGITE FORMATION IN PORTLAND CEMENT | | |
| 5 | $C_3A + 3(CaSO_4 \cdot 2H_2O) + 25 H_2O$ | $C_3A \cdot 3CaSO_4 \cdot 31H_2O$ ETTRINGITE (CEMENT BACILLUS) |

WHEREIN:
C = CaO
A = $Al_2O_3$
S = $SiO_2$
F = $Fe_2O_3$

Further, if during or after hardening, new hydration products with greater volume requirements are formed, disruption of the exiting concrete structure occurs. The classical example is the formation of ettringite. It is shown, Table 2, equation 5, that tricalcium aluminate ($C_3A$) can react with calcium sulfate ($CaSO_4 \cdot 2H_2O$) to give ettringite. Ettringite causes complete disruption of the concrete because of its expansion. It is a slow reaction and takes place when Portland cement is attacked by sulfates over prolonged periods. From the above, it is concluded that ettringite formation was the likely cause of the disintegration of the Portland cement blocks. Any sulfides present in or in contact with Portland cement can, over a long period of time, undergo oxidation to sulfates. The constant presence of calcium hydroxides leads then to the formation of calcium sulfate which will react with the tricalcium aluminate to form ettringite.

The retardation effect observed in the second experiment can be explained as follows. Most cement slurries contain small amounts of dissolved alumina. If at any time ions of arsenic, boron or phosphate enter the solution, the dissolved alumina is precipitated and forms a film around cement grains, thus retarding or completely inhibiting their reaction. Different types of retarders are known, those that effect the solubility of alumina temporarily and those that form insoluble salts that hold up setting and hardening indefinitely. Examples of the latter type are $Na_3PO_4$, $Na_2B_4O_7$, $Nahd\ 3AsO_4$, and $Ca(CH_3COO)_2$. To counteract the effect of retarders, accelerators can be used as will be more fully discussed below. Accelerators react preferentially with the retarder, thus allowing hydration to proceed.

Since most arsenic-contaminated wastes, especially spent guard bed material, contains sulfur or sulfur compounds or since the encapsulated arsenic-concrete mixture, if used as landfill, is likely to be contacted by sulfur-containing waters, it was concluded that Portland cement because of its high content of tricalcium aluminate was unacceptable as an encapsulating material.

Now turning to the present invention again, the arsenic-contaminated material is mixed with water, aggregate, and a non-Portland hydraulic cement which is free of tricalcium aluminate to form a concrete mixture which, when hardened, may be disposed of as a permanent landfill material without risk of the arsenic subsequently leaching into groundwaters even after prolonged periods. As used throughout, tricalcium aluminate-free hydraulic cement refers to those hydraulic cements which do not contain tricalcium aluminate as a constituent or, if any is present, it appears as an impurity in the cement in amounts so small as to be negligible. The preferred tricalcium aluminate-free hydraulic cement used in the present invention is one commonly known as "aluminous cement" which is made by heating a mixture of limestone and buxite to fusion and has monocalcium aluminate as its chief component. Other examples of cements which are substantially tricalcium aluminate-free hydraulic cements are those commonly known as "slag cements" and pozzalana cements. For a more complete description of tricalcium aluminate-free hydraulic cements, see THE CHEMISTRY OF CEMENTS, Taylor, Academic Press, 1964, Vol. 1, pp. 9–10 which is incorporated herein by reference.

To further understand the difference between Portland cement and tricalcium aluminate-free hydraulic cements such as aluminous cement, a comparison of the chemical composition of Portland cement and a typical commercially available aluminous cement (Fondu Calcium Aluminate Cement, sold by Lone Star Lafarge, Inc., Norfolk, Va.) is shown in TABLE 3 while the average chemical analysis of the two are shown in TABLE 4 below.

TABLE 3

MINERAL CONSTITUENTS OF PORTLAND AND ALUMINOUS CEMENT

| PORTLAND CEMENT | ALUMINOUS CEMENT |
|---|---|
| $C_3A\ 3CaO\cdot Al_2O_3$ | — |
| $C_3S\ 3CaO\cdot SiO_2$ | $CA\ CaO\cdot Al_2O_3$ |
| $C_2S\ 2CaO\cdot SiO_2$ | $C_{11}A_7\ 11CaO\cdot 7Al_2O_3$ |
| $C_4AF\ 4CaO\cdot Al_2O_3\cdot Fe_2O_3$ | $C_4AF\ 4CaO\cdot Al_2O_3\cdot Fe_2O_3$ |
| — | $C_2AS\ 2CaO\cdot Al_2O_3\cdot SiO_2$ |

TABLE 4

AVERAGE ANALYSIS OF PORTLAND AND FONDU CEMENT

| | PORTLAND CEMENT % | ALUMINOUS CEMENT (FONDU) % |
|---|---|---|
| CaO | 61–67 | 24–40 |
| $SiO_2$ | 18.6–23.3 | 2–6.5 |
| $Al_2O_3$ | 3.9–7.5 | 70–50 |
| $Fe_2O_3$ | 1.5–6.2 | ~1 |
| MgO | 0.6–5.2 | 0.6–1.0 |
| $SO_3$ | 0.8–2.3 | 0.2–0.3 |

More specifically, in carrying out the present invention, an arsenic-contaminated waste materials, e.g. spent guard bed material, is mixed with tricalcium aluminate-free hydraulic cement, an aggregate (e.g. Ottawa sand), and water to form a concrete slurry. As understood by those skilled in the art, the actual ratio between components will follow recognized American Society for Testing and Materials (ASTM) Standards used by the trade in forming high strength concretes and will vary depending on the actual mixtures involved. In actual practice, various mixtures will be made and strength tests will be carried out to arrive at the most desirable mixture for a particular waste material. Typical mixture ranges are as follows: 1 to 50 wt. percent of arsenic-contaminated material; 20 to 30 wt. percent tricalcium aluminate-free hydraulic cement; and 10 to 30 wt. percent aggregate, with the water/cement ratio being 0.37 to 0.60. Of course, the arsenic/contaminating material when in particulate form acts as an aggregate itself, and the final ratios will take this factor into consideration.

Since it has been determined that the presence of arsenic compounds (e.g. $As_2S_3$, arsenic trisulfide) will inhibit aluminous cements, it is preferred to add an accelerator to quicken the setting time of the wet concrete mixture. The normal accelerators for aluminous cements such as $CaCl_2$, Portland cement, and Cal-seal respectively, were found to have no apparent effect in the presence of $As_2S_3$. However, $FeCl_3$ and $AlCl_3$, upon experimentation, had a good effect on the inhibiting effect of $As_2S_3$. A series of other compounds such as sodium carbonate, sodium silicate, ferric ammonium oxalate, and sodium acetate were tested for their accelerating power but none of them showed any potential. The results of tests involving the above discussed accelerators are shown in TABLES 5 and 6 below.

TABLE 5

ACCELERATION STUDIES OF FONDU CEMENT CONTAINING $As_2S_3$

| | | 359-1 | 359-2 | 359-3 | 359-4 | 359-5 | 359-6 |
|---|---|---|---|---|---|---|---|
| FONDU CEM. | g. | 6.13 | 6.13 | 6.13 | 6.13 | 6.13 | 6.13 |
| OTTAWA SAND | g. | 16.87 | 16.87 | 16.87 | 16.87 | 16.87 | 16.87 |
| $As_2S_3$ | g. | 0.70 | 0.70 | 0.70 | 0.70 | 0.70 | 0.70 |
| WATER | ml. | 3.0 | 3.0 | 3.0 | 3.0 | 3.0 | 3.0 |
| ACCELERATOR | | $CaCl_2$ (4.9%) 0.300 g | $FeCl_3$ (5%) 0.308 | PORT.CMT. (5%) 0.308 | CAL-SEAL (5%)* 0.308 | $AlCl_3$ (5%) 0.308 | — |

TABLE 5-continued

ACCELERATION STUDIES OF FONDU CEMENT CONTAINING $As_2S_3$

| | 359-1 | 359-2 | 359-3 | 359-4 | 359-5 | 359-6 |
|---|---|---|---|---|---|---|
| WATER/CEMENT RATIO | 0.49 | 0.49 | 0.49 | 0.49 | 0.49 | 0.49 |
| SET TIME, INITIAL | >17 hours | 2 hours | not at all | >17 hours | 2 hours | not at all |
| FINAL | only partially | 24 | not at all | only partially | 24 | not at all |

*$CaSO_4 \cdot \frac{1}{2}H_2O$

TABLE 6

ACCELERATION STUDIES OF FONDU CEMENT CONTAINING $As_2S_3$

| | | 363-1 | 363-2 | 363-3 | 363-4 | 363-5 | 363-6 |
|---|---|---|---|---|---|---|---|
| FONDU CEM. | g. | 6.13 | 6.13 | 6.13 | 6.13 | 6.13 | 6.13 |
| OTTAWA SAND | g. | 16.87 | 16.87 | 16.87 | 16.87 | 16.87 | 16.87 |
| WATER | ml. | 3.0 | 3.0 | 3.0 | 3.0 | 3.0 | 3.0 |
| $As_2S_3$ | g. | 0.7 | 0.7 | 0.7 | 0.7 | none | 0.7 |
| ACCELERATOR | | $Na_2CO_3$ (3%) 0.184 g | Na-SILICATE (3%) 0.184 g | Fe. AM. OX.** (3%) 0.184 g | Na-ACETATE (3%) 0.184 g | none | NaOH (3%) 0.184 g |
| WATER/CEMENT RATIO | | 0.49 | 0.49 | 0.49 | 0.49 | 0.49 | 0.49 |
| SET TIME, INITIAL | | 24 hours | 2 hours | 24 hours | 96 hours | 2 hours | 96 hours |
| FINAL | | never | never | never | never | 24 | never |

**$Fe(NH_4)_3(C_2O_4)_3 \cdot 3H_2O$

Further, since arsenic-contaminated material such as spent guard bed material contains not only arsenic compounds (e.g. FeAs; $FeAs_2$; $FeSA_s$) but may also contain some iron sulfides, the effects of the latter on the concrete mixture was also considered.

A spent guard bed material containing approximately 20 to 25 percent arsenic and a sample of ferrous sulfide were, therefore, tested with the results being shown in Table 7. Both acted as inhibitors especially on the initial setting time.

These results further indicate the need for a suitable accelerator. Based on the results shown in TABLE 5, it was determined that either $AlCl_3$ or $FeCl_3$ will effectively control the setting time of an aluminous cement-concrete. $FeCl_3$ is preferred because of its low price and its availability.

TABLE 7

SETTING-TIME STUDIES OF FONDU CEMENT CONTAINING FeS AND GUARD BED MATERIAL (IRON ARSENIDE)

| | | 357-1 | 357-2 | 358-1 | 358-2 |
|---|---|---|---|---|---|
| FONDU CEMENT | g. | 6.13 | 6.13 | 6.13 | 6.13 |
| OTTAWA SAND | g. | 15.61 | 15.61 | 16.87 | 16.87 |
| WATER | ml. | 3.0 | 3.0 | 3.0 | 3.0 |
| ADDITIVE | | As-GUARD BED 1.26 g | — | FeS 1.0 g | — |
| WATER/CEMENT RATIO | | 0.49 | 0.49 | 0.49 | 0.49 |
| SET TIME, INITIAL | | <43 hours | 2-3 hours | <17 hours | 2-3 hours |
| FINAL | | 48 hours | 24 hours | 24 hours | 24 hours |

TABLE 8

SETTING-TIME ACCELERATION WITH $FeCl_3$ OF FONDU CEMENT CONTAINING GUARD BED MATERIAL (IRON ARSENIDE)

| | | 360-1 | 360-2 | 360-3 | 360-4 | 363-5 |
|---|---|---|---|---|---|---|
| OTTAWA SAND | g. | 14.57 | 14.57 | 14.57 | 14.57 | 16.87 |
| FONDU CEMENT | g. | 6.13 | 6.13 | 6.13 | 6.13 | 6.13 |
| WATER | ml. | 3.00 | 3.00 | 3.00 | 3.00 | 3.00 |
| As-GUARD BED | g. | 2.30 | 2.30 | 2.30 | 2.30 | — |
| ACCELERATOR | | none | $FeCl_3$(1%) (0.062 g) | $FeCl_3$(2%) (0.124 g) | $FeCl_3$(4%) (0.248 g) | — |
| WATER/CEMENT RATIO | | 0.49 | 0.49 | 0.49 | 0.49 | 0.49 |
| SET TIME, INITIAL | | <96 hours | 24 hours | 2 hours | 2 hours | 2 hours |
| FINAL | | ~120 hours | 48 hours | 24 hours | 24 hours | 24 hours |

TABLE 8 above shows the effect of 1, 2, and 4 percent of $FeCl_3$, calculated with respect to cement, on the setting time of a concrete containing 10 percent spent guard bed material. The spent guard bed material had a loading of approximately 28 percent of arsenic (samples 360-2, 360-3, and 360-4). Sample 360-1 also contained spent guard bed material but no accelerator. It is severely inhibited and reaches a reasonable strength only after five days. In comparison, sample 365-5 contains neither spent guard bed material nor accelerator and has a setting time of one day. The amount of $FeCl_3$ needed ranges between 1 and 2 percent.

To establish strength and durability characteristics of the arsenic-contaminated material encapsulated in a concrete formed from tricalcium aluminate-free hydraulic cement, leaching studies were carried out on concrete samples identified as numbers 360-1 through 360-4, and the results are summarized on TABLE 9. Each sample is cylindrical (33 mm diam × 12 mm h) and weighed approximately 25 g. At an age of 7 days each sample was placed in a plastic box containing 400 ml of deionized water. In intervals of 1, 5, 12, 30, 41, 58, and 111 days, the water was analyzed for changes in pH and arsenic values. New water was then added.

TABLE 9

LEACH-WATER ANALYSIS OF FONDU CONCRETE SAMPLES
(as in parts per million, ppm)

| SAMPLE NO. | FeCl$_3$ | LEACHING PERIOD (DAYS) | | | | | | | |
|---|---|---|---|---|---|---|---|---|---|
| | | 1 | 5 | 12 | 20 | 30 | 41 | 58 | 111 |
| | % | ppm | ppm | ppm | ppm | ppm | ppm | ppm | ppm |
| 360-1 | none | 0.06 | <0.02 | 0.02 | 0.04 | 0.02 | 0.098 | 0.08 | 0.028 |
| 360-1 pH | | | | | 9.7 | 9.4 | 8.9 | 8.1 | 8.2 |
| 360-2 | 1 | 0.02 | <0.02 | 0.11 | 0.11 | 0.31 | 0.227 | 0.18 | 0.018 |
| 360-2 pH | | | | | 9.3 | 9.1 | 8.8 | 8.1 | 8.2 |
| 360-3 | 2 | <0.02 | <0.02 | 0.23 | 0.16 | 0.50 | 0.205 | 0.11 | 0.016 |
| 360-3 pH | | | | | 9.0 | 9.0 | 8.7 | 7.8 | 8.2 |
| 360-4 | 4 | <0.02 | <0.02 | 0.20 | 0.18 | 0.33 | 0.246 | 0.19 | 0.022 |
| 360-4 pH | | | | | 8.9 | 8.9 | 8.6 | 7.8 | 8.1 |

The initial arsenic concentration in the leach water increased during the first 30 days and consistently dropped off after that time as shown by the 41, 58, and 111 day values.

The lowest arsenic concentration was found in the ferric chloride free sample (360-1). A total of 0.366 ppm of arsenic was leached from this sample over a period of 111 days.

A similar comparison of the FeCl$_3$ accelerated samples shows 1.00 ppm (1% FeCl$_3$), 1.26 ppm (2% FeCl$_3$), and 1.21 ppm (4% FeCl$_3$) of arsenic.

It is apparent from these results that the addition of FeCl$_3$ enhances arsenic leaching, especially during the first 30 days. From 30 days on the amount of arsenic decreases again and reaches values even lower than that of the blank (FeCl$_3$-free) sample. This is particularly true after 111 days.

The effect of FeCl$_3$ on the acidity of the leach water was clearly noticed during the first 58 days. The acidity increases, as seen in TABLE 9, going from left to right and down within the columns. After 111 days, the leach water was slightly more basic than on the 58th day. It is conceivable that during the time span of 53 days (111 minus 58 days), more base was leached from the concrete, thus neutralizing the acid which derived from FeCl$_3$. When freshly added water was checked on the 113th day, after only two days exposure to the concrete samples, the pH value of the blank (360-1) was unchanged. However, all of the ferric chloride-containing samples were more acidic (sample 360-2, pH 7.9; 360-3, pH 7.8; 360-4, pH 7.9). These results indicate that there is still residual FeCl$_3$ present which contributes to the acidity.

Although it may be thought that the acidity or the porosity or both are the determining factors for the amount of arsenic leach out, the samples taken on the 111th day do not support that. In fact, the arsenic levels are higher in the blank (TABLE 8, 360-1) than in the FeCl$_3$ containing samples. There is, apparently, a leachable limit while the remainder of the arsenic is either inaccessible to the leach water or now have very little solubility. In our experiments the leachants contained from 0.02 ppm to a maximum of 0.5 ppm of arsenic.

In a further modification of the present invention, the final concrete mass formed by mixing an arsenic-contaminating material with aggregate, water and a tricalcium aluminate-free hydraulic cement is further treated by curing the concrete mixture in the presence of steam and/or vibrating the mixture as it hardens. This substantially increases the density of the final concrete product thereby increasing its durability and decreasing its porosity and permeability. Still further, the final concrete product may be made even denser by substituting silica "flour" (i.e. finely ground sand) for up to 25% of the aggregate to be used in the mixture. Even further still, where the final concrete product may be exposed to extremely severe conditions, the solid arsenic-containing material may first be coated with an organic resin before it is mixed with the cement.

To summarize, the present invention provides a method for encapsulating an arsenic-contaminated material in a concrete mixture formed by mixing the material with water, an aggregate, e.g. sand plus silica flour, and a cement which is free of tricalcium aluminate, e.g. aluminous cement. If the hardening time for the mixture is longer than desired or if compounds are present which substantially inhibit the mixture, an accelerator, e.g. FeCl$_3$, is added to the mixture. The mixture is poured into forms and is allowed to harden, preferably applying steam and vibrating the mixture while it hardens. The final product is removed and disposed of as a permanent landfill material or put to a similar use. Since the final product is highly resistant to both sulfate attack and to acids (up to pH4), it will not disintegrate after prolonged periods of exposure and accordingly any substantial leaching of arsenic even after such prolonged periods of time is prevented.

What is claimed is:

1. A method of encapsulating a solid arsenic-contaminated waste material having sulfur compounds therein in a concrete mixture to form a concrete product which prevents leaching of said arsenic therefrom even after prolonged contact with water, said method comprising:

mixing said solid arsenic-contaminated waste material with a non-Portland, tricalcium aluminate-free hydraulic cement;

adding sufficient water to said arsenic-contaminated material and said non-Portland, tricalcium aluminate-free hydraulic cement to produce a mixture having a consistencey of wet concrete;

mixing an accelerator chemical with said arsenic-contaminated material and said non-Portland tricalcium aluminate-free hydraulic cement before said mixture hardens to quicken the time required for hardening said mixture into said concrete product, said accelerator comprising ferric chloride; and allowing said mixture to harden under conditions sufficient to cause solidification to thereby form said concrete product.

2. The method of claim 1 wherein said arsenic-contaminated material having sulfur compounds therein comprises:

spent guard bed material used to extract arsenic from synthetic hydrocarbons.

3. The method of claim 1 wherein said non-Portland tricalcium aluminate-free hydraulic cement comprises: aluminous cement.

4. The method of claim 1 wherein said non-Portland tricalcium aluminate-free hydraulic cement comprises: slag cement.

5. The method of claim 1 wherein said non-Portland tricalcium aluminate-free hydraulic cement comprises: pozzolanas.

6. The method of claim 1 including:

mixing aggregate material with said arsenic-contaminated material and said non-Portland tricalcium aluminate-free hydraulic cement before said mixture is hardened to said concrete product.

7. The method of claim 6 wherein said aggregate material comprises:

sand.

8. The method of claim 6 wherein from 1 to 25 weight percent of said aggregate material is comprised of silica flour.

9. The method of claim 1 including:

vibrating said mixture while it is being allowed to harden.

10. The method of claim 1 including:

allowing said mixture to harden in the presence of steam.

* * * * *